(12) United States Patent
Kim

(10) Patent No.: US 7,542,409 B2
(45) Date of Patent: Jun. 2, 2009

(54) LOGICAL AND OPERATION DIVERSITY COMBINING METHOD

(75) Inventor: Jik-Dong Kim, Kyongki-Do (KR)

(73) Assignee: LG Electronics Inc., Seoul (KR)

( * ) Notice: Subject to any disclaimer, the term of this patent is extended or adjusted under 35 U.S.C. 154(b) by 1011 days.

(21) Appl. No.: 10/397,374

(22) Filed: Mar. 27, 2003

(65) Prior Publication Data
US 2004/0071093 A1    Apr. 15, 2004

(30) Foreign Application Priority Data
Oct. 11, 2002    (KR) ..................... 10-2002-0062141

(51) Int. Cl.
*H04J 11/00*    (2006.01)
(52) U.S. Cl. ................... 370/206; 370/319; 370/344; 714/18; 714/749; 714/751
(58) Field of Classification Search .............. 370/206, 370/207, 319, 344; 714/18, 749, 751
See application file for complete search history.

(56) References Cited

U.S. PATENT DOCUMENTS

| | | | | |
|---|---|---|---|---|
| 5,745,502 | A * | 4/1998 | Khayrallah et al. | 714/751 |
| 6,317,418 | B1 * | 11/2001 | Raitola et al. | 370/278 |
| 6,977,972 | B1 * | 12/2005 | Kandala et al. | 375/332 |
| 7,289,427 | B2 * | 10/2007 | Steer et al. | 370/208 |
| 2003/0007576 | A1 * | 1/2003 | Alavi et al. | 375/329 |
| 2003/0102905 | A1 * | 6/2003 | Ha et al. | 329/304 |
| 2004/0049725 | A1 * | 3/2004 | Golitschek et al. | 714/749 |

FOREIGN PATENT DOCUMENTS

| | | |
|---|---|---|
| JP | 2001-024726 | 1/2001 |
| WO | WO 99/04527 | 1/1999 |
| WO | WO 02/067491 | 8/2002 |

OTHER PUBLICATIONS

Japanese Office Action dated Dec. 20, 2005 issued in Japanese Application No. 2003-098618.

Jik Dong Kim and Sang Wu Kim, "A Simple Packet Combining Technique in Frequency-Hopped Spread-Spectrum Multiple Access Communication Networks," Department of Electrical Engineering, Korea Advanced Institute of Science and Technology, 1997, pp. 1207-1211.

Jik Dong Kim, et al.: "A simple packet combining technique in frequency-hopped spread-spectrum multiple access communication networks" Communications, 1997. UCC '97Montreal, Towards the Knowledge Millennium. 1997 IEEE International Conference on Montreal, Que, Canada Jun. 8-12, 1997, New York, NY, USE, IEEE, US, Jun. 8, 1997, pp. 1207-1211, XP010226947 ISBN:0-7803-3925-8.

* cited by examiner

*Primary Examiner*—Aung S. Moe
*Assistant Examiner*—Christopher P Grey
(74) *Attorney, Agent, or Firm*—Ked & Associates, LLP

(57) ABSTRACT

A method for processing signals received in a communications system determines symbol information corresponding to a re-transmitted packet, compared the symbol information of the re-transmitted packet with symbol information of an original packet, and formed a combined packet based on a result of the comparing step.

42 Claims, 9 Drawing Sheets

ORIGINAL PACKET

RE-TRANSMITTED PACKET

★:OP
☆:RP

ORIGINAL PACKET(OP)　　RE-TRANSMITTED PACKET(RP)

LOGICAL AND OPERATION DIVERSITY COMBINING METHOD

BACKGROUND OF THE INVENTION

1. Field of the Invention

The present invention generally relates to a communications system, and more particularly to a system and method for performing an error control operation in a radio communications system.

2. Description of the Background Art

FIG. 1 shows a receiver in a conventional wireless communications system. This receiver includes an MPSK demodulator 10 for demodulating a re-transmitted packet signal using a soft decision method, a diversity combiner 20 for combining a symbol generated from the demodulator 10 with a previously received error packet signal (hereinafter referred to as 'original packet signal'), and a decoder 30 for decoding the combined symbol.

The MPSK (M-ary Phase Shift Keying) demodulator performs a modulation method in which only phase is changed with amplitude, a frequency of a carrier is constantly maintained, and a plurality of bits are transmitted at one time. As the signal is modulated, 2-bit or 4-bit data is transmitted by one modulation signal. That is, an unmodulated signal is transmitted one bit at a time but in the case of 4 binary-PSK modulations 2 bits are transmitted at a time using a phase change of the signal. 16 binary-PSK allows transmission of 4 bits at a time.

MPSK modulation is based on the assumption that M=2n where M is the number of modulation signals (or symbols) with different phases and n signifies the number if bits transmittable at a time. In this modulation scheme, a phase difference between carriers is $2\pi/M$ and can be implemented using an orthogonal representation system.

The diversity combiner performs a symbol diversity combining technique. According to this technique, symbols with noise are held, not discarded, and are then effectively combined with the same symbols which have been re-transmitted in order to control an error and thereby heighten reliability of the symbols. Adoption of a symbol diversity combining method in a radio communication system is desirable because it increases reliability of the symbols. Thus, various diversity combining methods have been proposed such as an equal-gaining-combining method and a maximal-ratio-combining, method.

Among these, the maximal-ratio-combining method is considered the most effective. This method adds ratios of the sizes of signals and then maximizes a signal-to-noise ratio in an environment where a signal plus an additive white Gaussian noise is received. The maximal-ratio-combining method has excellent performance but its calculation method is very complicated because it uses a soft-decision value.

In operation, the signal output from the MPSK demodulator (i.e. the symbol) is a value obtained by performing a soft-decision operation on a re-transmitted packet signal as received. This value is generally expressed as a real number with a decimal point. When the symbol is transmitted to the diversity combiner 20, the diversity combiner combines it with a symbol of an original packet. The combining process performed by the diversity combiner is expressed as follows:

(weight value *x*\*symbol *A*)+(weight value *y*\*symbol *B*)→(1.1\*0.789)+(0.8\*1.125)=1.768 wherein the weight value is a weight value of a channel which transmitted an original packet, the weight value 'Y' (0.8) is a weight value of a channel which transmitted a re-transmission packet, the symbol 'A' is a symbol of an original packet, the symbol 'B' (1,125) is a symbol of a re-transmission packet, and 1.768 is a result value output from the diversity combining process according to the MRC.

The result value (1.768) of the combining process is transmitted to the decoder 20, and the decoder determines the re-transmitted packet signal using the received result value and performing error-correction decoding. The decoder 30 usually performs only an error-correction function. Though not shown in Figure 1, the maximal-ratio combining (MRC) diversity combiner includes a channel estimator to overcome multipath fading. The channel estimator attempts to estimate a size of a channel through which received signals and phase information have passed.

The result value (1.768) of the combining process is transmitted to the decoder 20, and the decoder determines the re-transmitted packet signal using the received result value and performing error-correction decoding. The decoder 30 usually performs only an error-correction function. Though not shown in FIG. 1, the MRC diversity combiner includes a channel estimator to overcome multipath fading. The channel estimator attempts to estimate a size of a channel through which received signals and phase information have passed.

The MRC diversity combiner of the conventional art has disadvantages. For example, this MRC requires use of the channel estimator. Also, this MRC is hard to implement due to use of the soft decision value in the symbol demodulation process and requires a very large amount of calculations to be performed, which translates into increased complexity. These calculations include multiplication and addition of real numbers below a decimal point and are performed in the MRC scores of times more than the bit logical operation of the present invention, described in detail below. The conventional art MRC is therefore very complex. In addition, in the MRC a channel estimated value, a soft-decision value, and a calculation result value are stored as real numbers. As a result memory space is wasted.

A need therefore exists for a diversity combiner which performs fewer calculations that a conventional MRC combiner and which is therefore more efficient and cost effective to implement.

SUMMARY OF THE INVENTION

An object of the present invention is to provide a system and method for performing a diversity operation in a communication receiver in a manner which is less computationally complex and thus more effective to implement than Conventional MRC diversity combiners.

Another object of the present invention is to provide a diversity combining system method in a communications receiver which may be applied to multiple types of erase-error correction code systems.

Another object of the present invention is to provide a system and method of the aforementioned type which performs a logical operation in lieu of the computations performed in a conventional MRC combiner.

To achieve these and other objects and advantages, the present invention provides a logical operation diversity combining method which includes: receiving and demodulating a re-transmitted packet, decoding a symbol generated from demodulation, combining the generated symbol with a symbol of an original packet when an error is detected from the decoded signal, decoding a symbol of the re-transmitted packet based on the combining result, and when an error is detected from the secondly decoded signal requesting a packet retransmission The combining step is advantageously performed based on a logical operation, which according to one non-limiting embodiment includes a logical AND operation. By performing a logical operation instead of the computations in a convention MRC diversity combiner, the channel estimator maybe eliminated and efficiency increased.

DETAILED DESCRIPTION OF PREFERRED EMBODIMENTS

Figure 1:
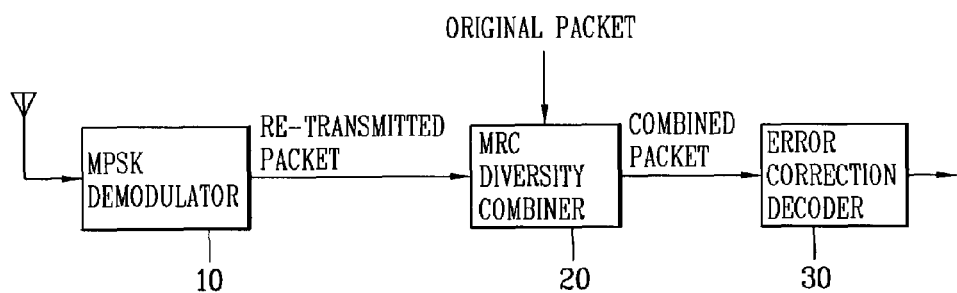
FIG. 1 is a drawing illustrating a construction of receiving system in accordance with the conventional art.
Figure 2:
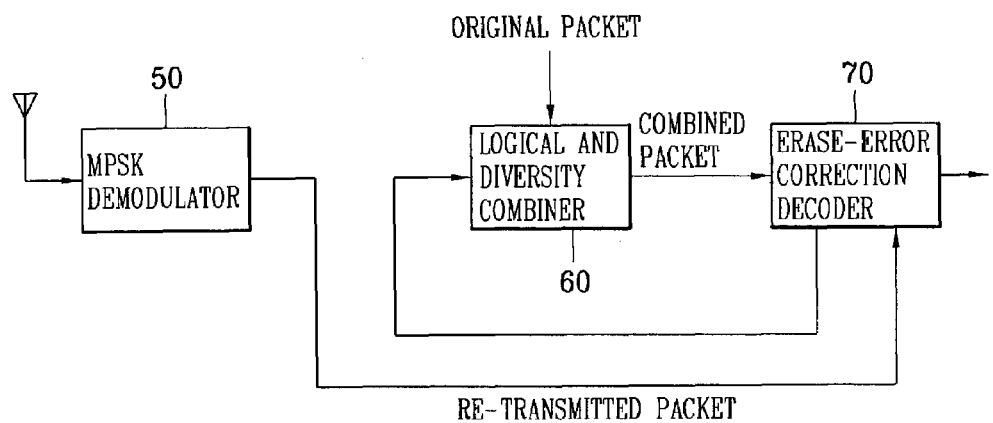
FIG. 2 is a drawing illustrating a construction of a receiving system in accordance with the present invention.

FIG. 2 shows a receiving system in accordance with one embodiment of the present invention. The system includes an MPSK demodulator 50 for demodulating a re-transmitted packet according to hard-decision method, a diversity combiner 60 for combining a symbol generated from the demodulator 50 with a symbol of an original packet, and a decoder 70 for decoding a symbol of the re-transmitted packet based on a result output from the combiner. The diversity combiner 60 performs a combining process based on a logical operation, and the decoder 70 may be an erase-error correction decoder. Preferably, the logical operation includes a logical AND of the combined symbols.

Figure 3:
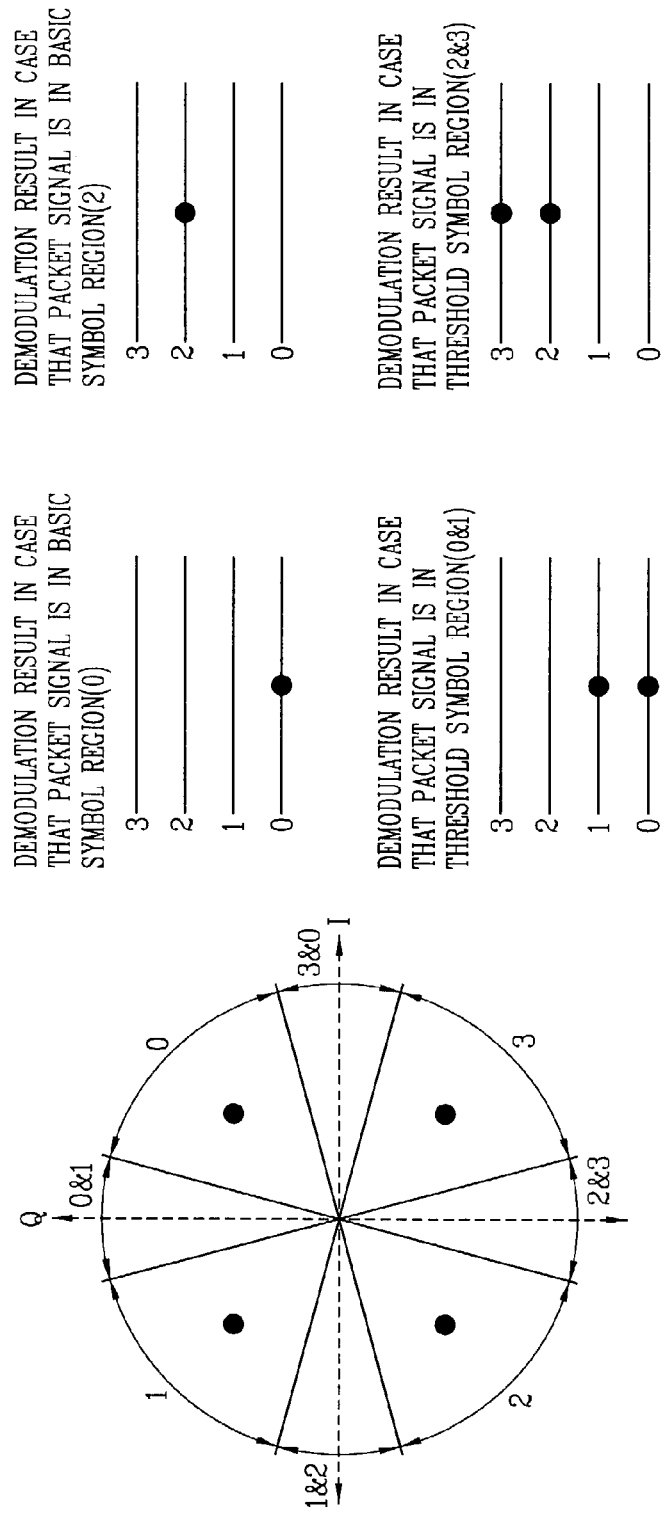
FIG. 3 is a drawing illustrating an MPSK demodulation in accordance with the present invention.
Figure 4A:
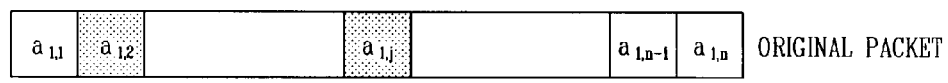
FIGS. 4A and 4B show examples of original and re-transmitted packets that maybe combined in accordance with the present invention.
Figure 4B:
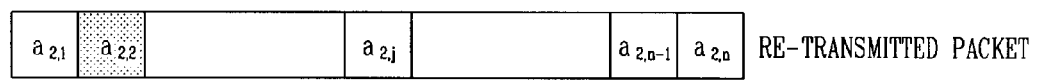

FIG. 3 is a conceptual diagram how an MPSK demodulation may be performed in accordance with the present invention. As shown, this demodulation method uses QPSK (Quadrature Phase Shift Keying) techniques. Before describing this step of the invention, it is initially noted that before receiving the re-transmitted packet an original packet was received containing errors. A re-transmission request for the packet was then sent from the receiver to the transmitter. The re-transmitted packet is then subsequently received. In accordance with one embodiment of the invention, each of the original and re-transmitted packets includes a plurality of signals. The signals in the original packet are illustratively shown as $a_{1,1}$, $a_{1,2}$ Y $a_{1,n}$ in FIG. 4A and the signals in the re-transmitted packet are illustratively shown as $a_{2,1}$, $a_{2,2}$ ... $a_{2,n}$ in FIG. 4B.

In performing the MPSK demodulation step of the present invention, it is noted that demodulation is performed on a signal-by-signal basis for each signal in the re-transmitted packet. Demodulation is preferably performed based on the exemplarily phasor diagram shown in FIG. 3. As shown, this phasor diagram includes a predetermined number of sectional basic symbol regions and a predetermined number of sectional threshold symbol regions. For illustrative purposes only, 4 basic symbol regions and 4 threshold symbol regions are shown, with the threshold symbol regions situated between the basic symbol regions respectively. The range of the threshold symbol regions should be optimized in order to maximize MPSK demodulation performance.

In accordance with the present invention, the MPSK demodulator 50 performs a demodulation using a hard-decision value. That is, each signal of a packet belongs to one of the 8 symbol regions of the phasor diagram and is converted into a symbol value of the region to which it belongs. Each symbol region may be determined as follows.

First, it is noted that each signal of a packet contains I and Q signals (or orthogonal coefficients). The I and Q signals correspond to a coordinate value which indicates a position of the packet signal when the packet signal is expressed on the phasor diagram.

According to the symbol region to which the packet signal belongs, the MPSK demodulator 50 converts the packet signal into one of four basic symbols (0, 1, 2, 3) or converts it into one of four threshold symbols (0&1, 1&2, 2&3, 3&0). The threshold symbol (0&1) has a high possibility that a noise component is mixed in the basic symbol (0) or the basic symbol (1). The threshold symbol (1&2) has a high possibility that a noise component is mixed in the basic symbol (1) or the basic symbol (2). The threshold symbol (2&3) has a high possibility that a noise component is mixed in the basic symbol (2) or the basic symbol (3). The threshold symbol (3&0) has a high possibility that a noise component is mixed in the basic symbol (3) or the basic symbol (0).

From this explanation, it is clear that in accordance with at least one embodiment of the invention, a packet signal belonging to one of the basic symbol regions is expressed only by a corresponding symbol, while a packet signal belonging to one of the threshold symbol regions is expressed by two basic symbols which adjoin the corresponding threshold symbol region. For example, if a packet signal is positioned at the basic symbol region (0), the packet signal is converted into a basic symbol (0). However, if a packet signal is positioned at the threshold symbol region (3&0) between the basic symbol region (3) and the basic symbol region (0), the packet signal is converted into a threshold symbol having both the basic symbol (3) value and the basic symbol (0) value.

The signals of the re-transmitted packet from the MPSK demodulator 50 are sent to the decoder 70, and the decoder decodes the signals and checks whether there is an error in the re-transmitted packet. During the decoding process, a threshold symbol may be processed by being regarded as an erase symbol. If there is an error in the error-checking process, the signals output from the MPSK demodulator 50 are sent to the diversity combiner 60.

Figure 5A:
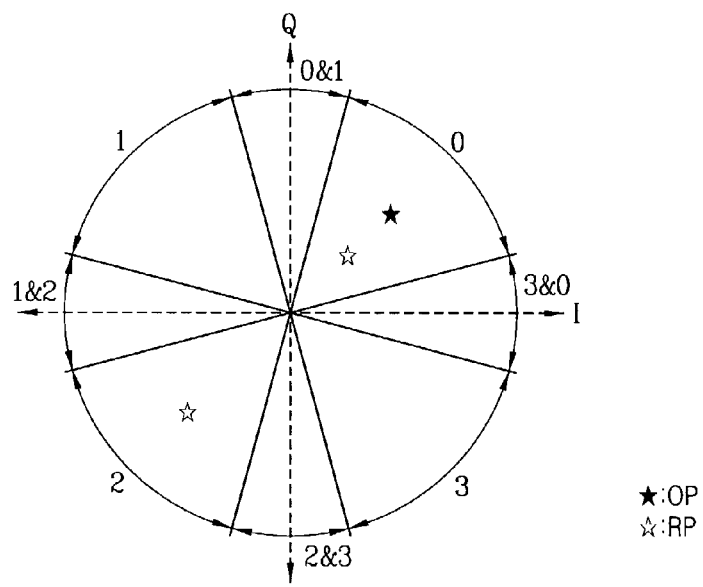
FIG. 5A is an exemplary view of a diversity combining method and of a case where the number of combining result value is '0' in accordance with the present invention.
Figure 5A:
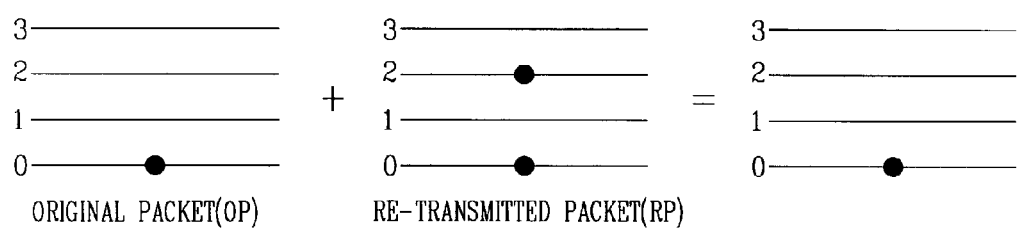
Figure 5B:
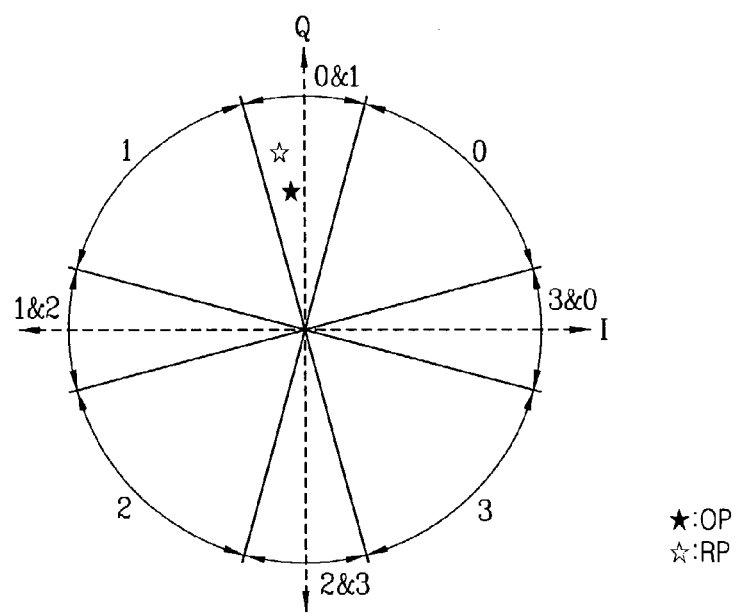
FIG. 5B is an exemplary view of a case that the number of operation result value is '2'.
Figure 5C:
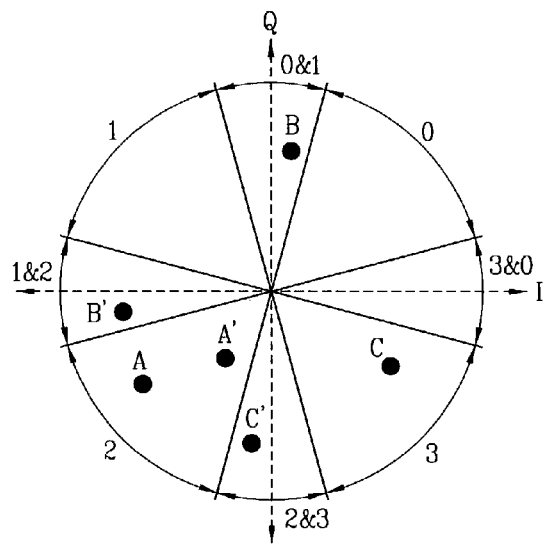
FIG. 5C is an exemplary view of a case that the number of operation result value is '1'.

FIG. 5A through 5C illustrate some of the techniques the diversity Combiner of the invention may implement and their results. This explanation is provided on a signal-by-signal basis with the understanding that all signals in the retransmitted packet may be combined with corresponding signals in the original packet.

When a signal output from the MPSK demodulator 50 (that is, a signal from the demodulated re-transmitted packet) is transmitted to the diversity combiner 60, the diversity combiner 60 performs a local operation on the symbol of the demodulated re-transmitted packet signal and the symbol of the corresponding signal in the original packet. This logical operation preferably includes an AND operation, but those skilled in the art can appreciate that other logic gate arrangements may also be used as long as these arrangements provide an output which may be used in accordance with the invention as described below.

FIG. 5A is an exemplary view of a diversity combining method in the case where the number of the combining result value is '0', FIG. 5B is an exemplary view of a case where the number of operation result value is '2', and FIG. 5C is an exemplary view of a case where the number of operation result value is '1'.

In FIG. 5A if two compared symbols are different (0,2), the number of the operation result value is '0'. Then, the decoder 70 regards the corresponding symbols as erase symbols and decodes them.

In FIG. 5B, if two compared symbols are identical to each other and are threshold symbols, the number of the operation result value is '2'. Then, the decoder 70 regards the corresponding symbols as erase symbols and decodes them.

In the remaining cases, the symbols are decoded but are not regarded as erase symbols. In FIG. 5C, if two compared symbols (A,A') are identical and are basic symbols, the number of the operation result value is '1'. Then, the decoder 70 decodes the corresponding symbols normally, i.e., based on their actual symbols. There symbols are therefore not considered erase symbols.

If the two compared symbols (B, B') are different threshold symbols (0&1, 1&2) but neighboring symbols having the same basic symbol (1) therebetween, the number of the operation result value is '1' and the decoder 70 normally decodes the corresponding symbols.

If one (C) of the two symbols (C, C') is a basic symbol (3) and the other symbol (C') is a threshold symbol (2&3) adjacent to the basic symbol (3), the number of the operation result value is '1' and the decoder 70 normally decodes the corresponding symbols, i.e., not as erase symbols.

Thus, the decoder 70 regards the corresponding symbol as an erase symbol and performs an erase-error correction decoding only if the number of the ANDing result value is '0' or '2'. The diversity combining method of the present invention may therefore be applied for every type of erase-error correction coding.

Figure 6:
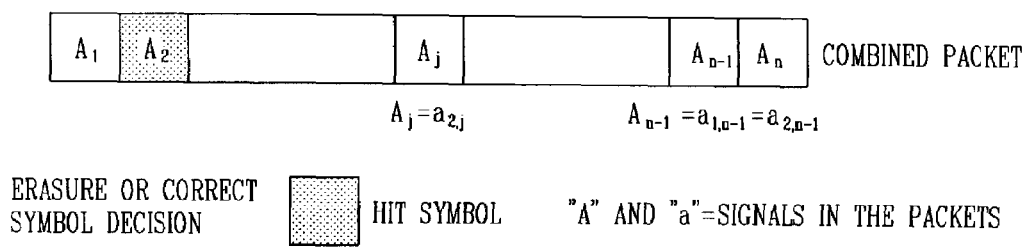
FIG. 6 shows an example of a combined packet formed by the present invention as a result of combining the packets of FIGS. 4A and 4B.
Figure 7A:
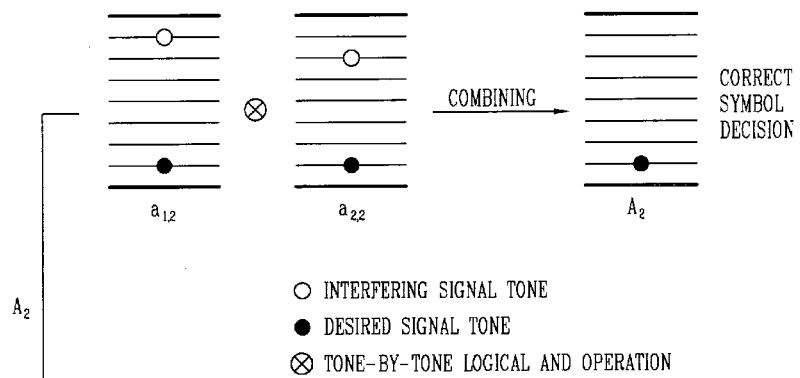
FIGS. 7A and 7B respectively show cases where a signal in the combiner packet of FIG. 6 may have a correct or normal symbol and an erase symbol.
Figure 7B:
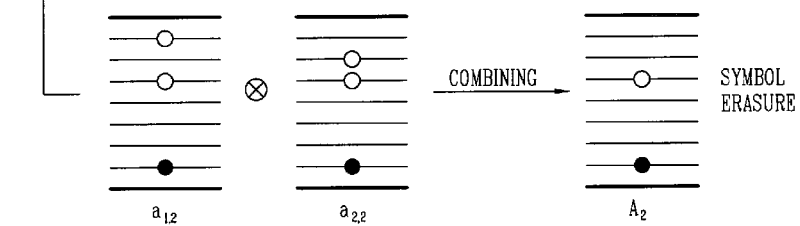

The result this combining step is a combined packet such as shown in FIG. 6. In this packet, the shaded signal $A_2$ has been given an erase symbol because one of the aforementioned conditions has been satisfied for assigning an erase symbol. The non-shaded signals, however, are not erase symbols but rather are given normal values (i.e., $A_i = a_{2,i}$ and $A_{n-1} = a_{1,n-1} = a_{2,n-1}$). The logical AND operation performed for signal $A_2$ in the combined packet is shown in FIGS. 7A and 7B for two cases, one where the signal $A_2$ in the combined packet corresponds to a correct symbol (not-erase) decision and the other where the signal $A_2$ in the combined packet corresponds to an erase signal. A more specific explanation may be given as follows.

Referring to FIGS. 7A and 7B, the case of combining an original packet and a re-transmitted packet is considered. Here, $a_{1,j}$ denotes the $j^{th}$ symbol of the previously transmitted (or original) packet, $a_{2,j}$ denotes the threshold decision output of the $j^{th}$ symbol of the re-transmitted packet, and $A_j$ denotes $j^{th}$ symbol of the combined packet formed in accordance with the present invention. In this example, the decision of $A_2$ is made by a logical AND of $a_{1,2}$ and $a_{2,2}$. The decision maybe correct (e.g., no error) if the logical AND yields only a logic '1'. This corresponds to a correct decision symbol case. If the logical AND yields, for example, more than one logic '1', the decision of $A_2$ may correspond to an erase symbol.

Figure 8:
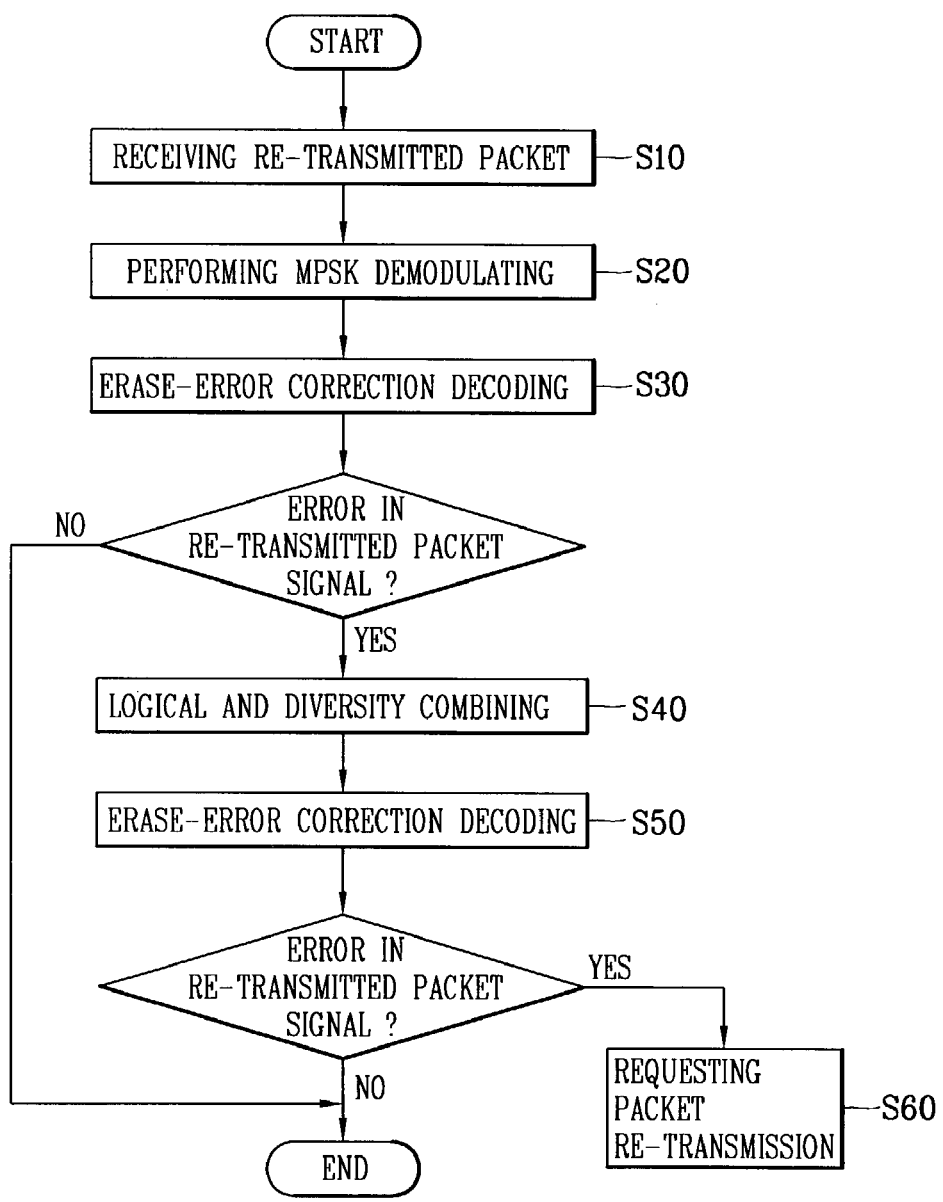
FIG. 8 is a flow chart of the diversity combining method in accordance with the present invention.

FIG. 8 is a flow chart showing steps included in a diversity combining method in accordance with the present invention. The method includes as an initial step receiving a re-transmitted packet (S10) and demodulating the received packet using MPSK modulation (S20). Next, a symbol generated for each signal in the packet from demodulation is decoded (S30). Next, it is determined whether an error exists in the re-transmitted packet signal. When any error is detected in the decoded signal, the generated symbol is combined with a symbol of a corresponding signal in the original packet (S40). Then, a second decoding step (S50) is performed in which a symbol of the retransmitted packet is decoded based on the combining result. In step (S60), when an error is detected from the secondly decoded signal, a packet re-transmission is requested.

A more detailed description of a preferred embodiment of the diversity combining method of the present invention will now be provided. In this method, if a re-transmitted packet is received (step S10), the re-transmitted packet is demodulated according to the demodulation method of the present invention (step S20). Erase-error correction decoding and error detecting are then performed on symbols generated for the signals in the demodulated packet (step S30). If there is an error in the demodulated re-transmitted packet, diversity combiner 60 ANDs the symbol generated from the demodulated re-transmitted packet with the symbol original packet on a signal-by-signal basis. This results in the formation of a combined packet. Then, erase-error correction coding and error detecting are performed on the re-transmitted (or Combined) packet with reference to the operation result (step S50).

The error detecting maybe performed by an error detector (not shown) or a controller (not shown) at the next stage of the decoder 70. The error detecting step and the decoding steps are separately performed steps, but for this explanation's sake it is considered that decoder 70 also performs the error detecting function.

The diversity combining method of the present invention will now be described in detail with reference to FIGS. 2, 3, 4 and 5. When the re-transmitted packet is received in (step S10), the MPSK demodulator 50 demodulates the re-transmitted packet according to the demodulation method proposed in the present invention (step S20). Namely the signal demodulated by the MPSK demodulator 50 is expressed or one of 8 symbols (1, 0&1, 1, 1&2, 2, 2&3, 3, 3&0) depending on the position of the packet signal appearing on the phasor diagram.

For each signal in the re-transmitted packet, demodulated signal (or the symbol) is decoded by the decoder 70 (step S30). At this time, the decoder 70 regards a threshold symbol among symbols outputted by the MPSK demodulator 50 as an erased symbol and decodes it. The decoder 70 also checks whether there is an error in the re-transmitted packet which has been through the decoding process.

If there is an error in the re-transmitted packet, the symbol of the re-transmitted packet output from the MPSK demodulator 50 is sent to the diversity combiner 60. Then, the diversity combiner 60 ANDs the symbol of the re-transmitted packet with a symbol of the corresponding original packet (step S40).

The decoder 70 performs decoding and error detecting with reference to the operation result of the diversity combiner 60 (step S50). That is, if the number of the ANDing result value is '0' or '2', the decoder 70 regards the corresponding symbol as an erased symbol and performs decoding of a combined packet and error detection. If the re-transmitted packet is determined to have an error again in the step S50, the receiving party requests re-transmission of the corresponding packet from the transmitting party (stepS60). If, however, the re-transmitted packet is determined to have no error in the step S30 or in the step S50, the error control routine for the corresponding packet is terminated.

As so far described, in the present invention the first error control process is performed through the MPSK demodulation step (S20) and the erase-error correction decoding step (S30), and the second error control process is performed through the diversity combining step (S40) and the erase-error correction decoding step (S50).

More specifically, the error control routine is designed such that the diversity combining step (S40) is not performed if the error of the re-transmitted packet is correctable in the first error control process. This is advantageous in that the re-transmitted packet can be quickly processed without an error.

The diversity combining method of the present invention thus has the following advantages. First, since the diversity combining is implemented by the logical AND operation, the operation process is very simple compared to that of the conventional method such as the MRC and uses less memory. Besides, since the hard-decision value is used in the demodulation process, the diversity combining method can be easily implemented. Second, the diversity combining method if the present invention can be easily adapted to any erase-error correction code system and does not need to channel estimator. As a result, the invention is far less complex to implement compared with the conventional art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for processing signals received in a communications system, comprising:
   determining symbol information corresponding to a re-transmitted packet that contains a plurality of signals, said determining including determining a hard-decision symbol value for each of the signals in said re-transmitted packet, said hard-decision symbol value indicative of a location of a corresponding one of the signals in a phasor diagram that includes a plurality of basic symbol regions and a plurality of threshold symbol regions;
   comparing the symbol information of said re-transmitted packet with symbol information of an original packet, said comparing including comparing said hard-decision symbol value for each signal in said re-transmitted packet with a hard-decision symbol value for a corresponding signal in said original packet, said comparing further including performing a logical operation between said hard-decison symbol value for each signal in said re-transmitted packet and said hard-decision symbol value for the corresponding signal in said original packet;
   forming a combined packet based on a result of the comparison;
   performing error detection on said combined packet; and
   transmitting a re-transmission request based on a result of said error detection.

2. The method of claim 1, wherein the hard-decision symbol value for each signal is based on in-phase (I) and quadrature (Q) components of said each signal.

3. The method of claim 1, wherein the hard-decision symbol value for each signal is determined by:
   determining in-phase (I) and quadrature (Q) components corresponding to said each signal;
   locating the I and Q components on the phasor diagram; and
   assigning the hard-decision symbol value to said each signal based on a location of the I and Q components on the phasor diagram, the hard-decision symbol value indicative of a value corresponding to one of the basic symbol regions or a value corresponding to one of the threshold symbol regions in the phasor diagram,
   wherein each threshold symbol region corresponds to a region overlapping two adjacent basic symbol regions.

4. The method of claim 1, wherein the threshold symbol regions are interleaved between the basic symbol regions.

5. The method of claim 1, further comprising:
   determining which of said threshold symbol regions or which of said basic regions the I and Q components of said each signal is located; and
   assigning said each signal a symbol which corresponds to said determined region, each threshold symbol region corresponding to a region overlapping two adjacent basic symbol regions.
   determining a symbol value for each signal in the re-transmitted packet based on the comparison.

6. The method of calim 1, further comprising:
   determining a symbol value for each signal in the re-transmitted packet based on the comparison.

7. The method of claim 6, further comprising:
   determining whether the symbol value determined for each signal in the re-transmitted packet corresponds to one of an erase symbol and a not-erase symbol.

8. The method of claim 7, wherein, for each signal in the combined packet, the symbol value is determined to be an erase symbol if one of the following conditions exist:
   (a) the symbol value for the signal in the re-transmitted packet and the symbol value for the signal in the original packet do not match and correspond to basic symbol values; or
   (b) the symbol value for the signal in the re-transmitted packet and the symbol value for the signal in the original packet are threshold values and identically match.

9. The method of claim 8, wherein, for each signal in the combined packet, the symbol value is determined to be a not-erase symbol if neither case (a) nor case (b) exists.

10. The method of claim 6, wherein the forming includes forming the combined packet to include at least one erase symbol in accordance with said determining.

11. The method of claim 10, further comprising:
    performing at least one of a decoding operation and an error detection on the combined packet.

12. The method of claim 11, further comprising:
    determining whether an error exists in the signal decoded in the performing step.

13. The method of claim 12, wherein if an error is determined to exist said method further comprises transmitted a request for re-transmission of the re-transmitted packet.

14. The method of claim 1, farther comprising:
    demodulating the re-transmitted packet based on a hard-decision value.

15. The method of claim 1, wherein the logical operation includes a logical AND operanon.

16. A method for processing signals received in a communications system, comprising:
- determining symbol information corresponding to a re-transmitted packet that contains a plurality of signals, said determining including determining a hard-decision symbol value for each of the signals in said re-transmitted packet, said hard-decison decision symbol value indicative of a location of a corresponding one of the signals in a phasor diagram that includes a plurality of basic symbol regions and a plurality of threshold symbol regions;
- comparing said symbol information of said re-transmitted packet with symbol information of an original packet;
- forming a combined packet based on a result of the comparison,
- performing error detection on said combined packet; and
- transmitting a re-transmission request based on a result of said error detection, wherein said hard-decision symbol value for each signal is determined by:
- determining in-phase (I) and quadrature (Q) components corresponding to said each signal;
- locating the I and Q components on the phasor diagram; and
- assigning said hard-decision symbol value to said each signal based on a location of said I and Q components on said phasor diagram, and
- wherein symbols are assigned to respective ones of said basic symbol regions and said threshold symbol regions, each threshold symbol region corresponding to a region overlapping two adjacent basic symbol regions, and wherein the symbols assigned to respective ones of the basic symbol regions and the threshold symbol regions are QPSK values.

17. The method of claim 16, wherein the symbol information of the re-transmitted packet is compared with symbol information of the original packet based on a logical operation that includes an AND operation.

18. A communications receiver, comprising:
- a processor which determines symbol information corresponding to a re-transmitted packet that contains a plurality of signals, the symbol information including a hard-decision symbol value for each of the signals in said re-transmitted packet, said hard-decision symbol value indicative of a location of a corresponding one of the signals in a phasor diagram that includes a plurality of basic symbol regions and a plurality of threshold symbol regions;
- a comparator which compares said symbol information of said re-transmitted packet with symbol information of an original packet, the comparator comparing said hard-decision symbol value for each signal in said re-transmitted packet with a hard-decision symbol value for a corresponding signal in said original packet, said comparing including performing a logical operation between said hard-decision symbol value for each signal in said re-transmitted packet and said hard-decision symbol value for the corresponding signal in said original packet; and
- a combiner which forms a combined packet based on a result of the comparison.

19. The communications receiver of claim 18, wherein the hard-decision symbol value for each signal is based on in-phase (I) and quadrature (Q) components of said each signal.

20. The communications receiver of claim 18, wherein the processor determines the hard-decision symbol value for each signal by determining in-phase (I) and quadrature (Q) components corresponding to said each signal, locating the I and Q components on the phasor diagram, and assigning the hard-decision symbol value to said each signal based on a location of the I and Q components on the phasor diagram.

21. The communications receiver of claim 18, wherein the threshold regions are interleaved between the basic symbol regions.

22. The communications receiver of claim 18, wherein the processor determines which of said threshold symbol regions and basic symbol regions the I and Q components of said each signal is located, and assigns said each signal a hard-decision symbol value which corresponds to said determined region, each threshold symbol region corresponding to a region which overlaps two adjacent basic symbol regions.

23. The communications receiver of claim 18, wherein the combiner determines a symbol value for each signal in the re-transmitted packet based on the comparing step.

24. The communications receiver of claim 23, wherein the combiner determines whether the symbol value determined for each signal in the re-transmitted packet corresponds to one of an erase symbol and a not-erase symbol.

25. The communications receiver of claim 24, wherein, for each signal in the combined packet, the combiner determines that the symbol value is an erase symbol if one of the following conditions exist:
- (a) the symbol value for the signal in the re-transmitted packet and the symbol value for the signal in the original packet do not match and correspond to basic symbol values; or
- (b) the symbol value for the signal in the re-transmitted packet and the symbol value for the signal in the original packet are threshold values and identically match.

26. The communications receiver of claim 25, wherein, for each signal in the combined packet, combiner determines that the symbol value is a not-erase symbol if neither case (a) nor case (b) exists.

27. The communications receiver of claim 23, wherein the combiner forms the combined packet to include at least one erase symbol.

28. The communications receiver of claim 27, further comprising:
- a decoding unit which performs a decoding operation on the combined packet; and
- an error detection unit which detects whether an error exists in the decoded combined packet.

29. The communications receiver of claim 28, further comprising:
- a transmitter which transmits a request for re-transmission of the re-transmitted packet if the error detection unit detects an error in the decoded combined packet.

30. The communications receiver of claim 18, further comprising:
- a demodulator which demodulates the re-transmitted packet based on a hard-decision value.

31. The communications receiver of claim 19, wherein the comparator compares the hard-decision symbol value for each signal in the re-transmitted packet with a hard-decision symbol value for a corresponding signal in an original packet based on a logical operation that includes an AND operation.

32. A communications receiver, comprising:
- a processor which determines symbol information corresponding to a re-transmitted packet that contains a plurality of signals, the symbol information including a hard-decision symbol value for each of the signals in said re-transmitted packet;
- a comparator which compares said symbol information of said re-transmitted packet with symbol information of an original packet; and a combiner which forms a combined packet based on a result of the comparison. wherein the processor:

determines said hard-decision symbol value for each signal by determining in-phase (I) and quadrature (Q) components corresponding to said each signal, locating the I and Q components on a phasor diagram, and assigning hard-decision symbol value to said each signal based on a location of the I and Q components on the phasor diagram, wherein the phasor diagram includes a predetermined number of basic symbol regions and a predetermined number of threshold symbol regions, where each threshold symbol region corresponds to an overlap of two adjacent basic symbol regions, and wherein symbols are assigned to respective ones of the basic regions and the threshold regions, and wherein the symbols assigned to respective ones of the basic regions and the threshold regions are QPSK values.

33. A diversity combining method, comprising:
(a) demodulating a re-transmitted packet which includes a plurality signals;
(b) deriving a hard-decision symbol value for each signal in the demodulated re-transmitted packet;
(c) detecting error in the said re-transmitted packet;
(d) combining The said hard-decision symbol value for each signal in said re-transmitted packet with a said hard-decision symbol value for a corresponding signal in an original packet;
(e) performing error detection based on a result of said combining in (d); and
(f)) requesting packet re-transmission if an error is detected in step (e).

34. The method of claim 33 wherein the demodulation performed in (a) includes M-ary Phase Shift Keying (MPSK) demodulation.

35. The method of claim 33 wherein step (a) comprises:
determining a symbol region to which the hard-decision symbol value of each signal in the re-transmitted packet signal belongs; and if, for each signal, the hard-decision symbol value is determined to belong to a basic symbol region of a phasor diagram, the signal is converted into a corresponding basic symbol, and if the hard-decision symbol value is determined to belong to a threshold symbol region of the phasor diagram, the signal is converted into a threshold symbol each threshold symbol region corresponding to a region overlapping two adjacent basis symbol regions.

36. The method of claim 35 further comprising: adjusting the threshold symbol region in a range based on communication environment.

37. The method of claim 33 further comprising; processing the signal having a threshold symbol as an erased symbol.

38. The method of claim 33, further comprising terminating an error control routine if no error is detected in (f), an error control routine for the corresponding packet is terminated.

39. The method of claim 33, wherein step (e) includes:
processing the hard-decision symbol value derived for of the received signal as an erase symbol if there is no process result value of the combining in (d) or if a process result value of the combining corresponds to a threshold symbol.

40. The method of claim 33 wherein the combining in (d) comprises for each signal, combining the hard-decision symbol value of the signal and the hard-decision symbol value of a corresponding signal in the original packet; and
if the two symbol values correspond to are different basic symbols, concluding that there is no process result value, and
if the two symbol values correspond to same threshold symbols, assigning a process result value to the threshold symbol.

41. The method of claim 33, wherein (e) is performed by an erase-error correction decoding method.

42. The method of claim 33, wherein the hard-decision symbol value for each signal in the re-transmitted packet is combined with a hard-decision symbol value for a corresponding signal in an original packet based on a logical operation that includes an AND operation.

* * * * *